United States Patent
Ouzineb et al.

(10) Patent No.: US 11,370,933 B2
(45) Date of Patent: Jun. 28, 2022

(54) POLYESTER/PRIMER/METAL COMPOSITE FILM THAT IS COHESIVE AND IMPERMEABLE TO GAS, METHOD FOR THE PRODUCTION THEREOF AND THE PRIMER UTILIZED IN SAID METHOD

(71) Applicant: TORAY FILMS EUROPE, Saint-Maurice-de-Beynost (FR)

(72) Inventors: Keltoum Ouzineb, Villeurbanne (FR); Maria Cristina Penache, Chavanoz (FR); Laurent Derveaux, Vertrieu (FR)

(73) Assignee: TORAY FILMS EUROPE, Saint-Maurice-de-Beynost (FR)

(*) Notice: Subject to any disclaimer, the term of this patent is extended or adjusted under 35 U.S.C. 154(b) by 496 days.

(21) Appl. No.: 15/766,777

(22) PCT Filed: Oct. 14, 2016

(86) PCT No.: PCT/FR2016/052670
§ 371 (c)(1),
(2) Date: Apr. 6, 2018

(87) PCT Pub. No.: WO2017/064445
PCT Pub. Date: Apr. 20, 2017

(65) Prior Publication Data
US 2018/0305572 A1 Oct. 25, 2018

(30) Foreign Application Priority Data

Oct. 16, 2015 (FR) ..................................... 1559896

(51) Int. Cl.
*C09D 133/06* (2006.01)
*C09D 5/02* (2006.01)
(Continued)

(52) U.S. Cl.
CPC .............. *C09D 133/06* (2013.01); *C08J 3/05* (2013.01); *C08J 3/24* (2013.01); *C08J 7/042* (2013.01); *C08J 7/043* (2020.01); *C08J 7/048* (2020.01); *C08J 7/056* (2020.01); *C09D 5/002* (2013.01); *C09D 5/024* (2013.01); *B32B 7/04* (2013.01); *B32B 7/12* (2013.01); *B32B 15/08* (2013.01); *B32B 27/08* (2013.01); *B32B 27/26* (2013.01); *B32B 27/36* (2013.01); *B32B 37/16* (2013.01); *B32B 2250/02* (2013.01); *B32B 2255/10* (2013.01); *B32B 2255/26* (2013.01); *B32B 2255/28* (2013.01); *B32B 2367/00* (2013.01); *B32B 2419/00* (2013.01); *B32B 2439/70* (2013.01); *B32B 2439/80* (2013.01); *C08J 2333/02* (2013.01); *C08J 2333/04* (2013.01); *C08J 2333/10* (2013.01); *C08J 2361/26* (2013.01); *C08J 2361/28* (2013.01); *C08J 2361/30* (2013.01); *C08J 2367/02* (2013.01); *C08J 2379/00* (2013.01); *C08J 2379/02* (2013.01); *C08J 2379/04* (2013.01);

*C08J 2400/14* (2013.01); *C08J 2433/06* (2013.01); *C08J 2433/12* (2013.01); *C08K 5/0025* (2013.01); *C08L 33/02* (2013.01); *C08L 33/04* (2013.01); *C08L 33/06* (2013.01); *C08L 33/08* (2013.01); *C08L 33/10* (2013.01); *C08L 61/26* (2013.01); *C08L 61/28* (2013.01);
(Continued)

(58) Field of Classification Search
None
See application file for complete search history.

(56) References Cited

U.S. PATENT DOCUMENTS

| 4,880,700 | A | | 11/1989 | Charmot et al. |
| 5,352,728 | A | * | 10/1994 | Kim ...................... C08F 279/02 524/501 |
| 2003/0130362 | A1 | * | 7/2003 | Van Rheenen ......... C08L 57/00 521/29 |
| 2005/0266239 | A1 | * | 12/2005 | Satake ................ G02F 1/13363 428/354 |

(Continued)

FOREIGN PATENT DOCUMENTS

| WO | WO-2014102487 A1 * | 7/2014 | .......... C09D 133/12 |
| WO | 2015/092329 A1 | 6/2015 | |

OTHER PUBLICATIONS

Dec. 19, 2016 International Search Report issued in International Patent Application No. PCT/FR2016/052670.

*Primary Examiner* — Vivian Chen
(74) *Attorney, Agent, or Firm* — Oliff PLC

(57) ABSTRACT

The aim of the invention is to provide polyester/primer/metallic coating composite films having good adherence of the metallic coating in dry and humid conditions. Said films also form a good gas barrier: oxygen permeability less than or equal to 0.8 cc/m2/d; water vapour permeability less than or equal to 0.3 g/m2/d. To this end, the invention concerns a composite film comprising a polyester substrate, at least one coating adhering on at least one of the faces of the substrate and at least one layer of primer for cross-linked adhesion between the substrate and the coating. Said primer comprises at least one acrylic and/or methacrylic polymer P1, at least one acrylic and/or methacrylic polymer P2 different from P1, at least one cross-linking agent, and, preferably, at least one polyester that is soluble or dispersible in water: —P1 having a gel content TG1>70% by dry weight with respect to P1; —P2 having a gel content TG2≤TG1 and ≤20% by dry weight, with respect to P2; —P1 having a surface-grafted free weak acid content≥0.8 in meq/g of polymer; —[P2]≤60% by weight on dry by weight in respect to P1+P2. The method for producing said film, the adhering primer, and the articles obtained using said film, also form part of the present invention.

18 Claims, No Drawings

(51) Int. Cl.

| | | |
|---|---|---|
| C08J 3/05 | (2006.01) | |
| C08J 3/24 | (2006.01) | |
| C08J 7/04 | (2020.01) | |
| C09D 5/00 | (2006.01) | |
| C08J 7/043 | (2020.01) | |
| C08J 7/048 | (2020.01) | |
| C08J 7/056 | (2020.01) | |
| B32B 7/12 | (2006.01) | |
| B32B 7/04 | (2019.01) | |
| B32B 27/08 | (2006.01) | |
| B32B 27/36 | (2006.01) | |
| B32B 37/16 | (2006.01) | |
| B32B 27/26 | (2006.01) | |
| B32B 15/08 | (2006.01) | |
| C08K 5/00 | (2006.01) | |
| C09J 5/00 | (2006.01) | |
| C09J 133/10 | (2006.01) | |
| C09J 5/06 | (2006.01) | |
| C09J 167/00 | (2006.01) | |
| C09J 179/02 | (2006.01) | |
| C09J 167/02 | (2006.01) | |
| C09J 133/06 | (2006.01) | |
| C09J 133/08 | (2006.01) | |
| C09J 133/04 | (2006.01) | |
| C09J 179/04 | (2006.01) | |
| C09J 179/00 | (2006.01) | |
| C09J 133/02 | (2006.01) | |
| C09J 161/26 | (2006.01) | |
| C09J 161/28 | (2006.01) | |
| C08L 67/00 | (2006.01) | |
| C08L 61/26 | (2006.01) | |
| C08L 33/04 | (2006.01) | |
| C08L 33/06 | (2006.01) | |
| C08L 79/02 | (2006.01) | |
| C08L 79/04 | (2006.01) | |
| C08L 61/28 | (2006.01) | |
| C08L 79/00 | (2006.01) | |
| C08L 33/08 | (2006.01) | |
| C08L 33/02 | (2006.01) | |
| C08L 33/10 | (2006.01) | |
| C08L 67/02 | (2006.01) | |

(52) U.S. Cl.
CPC ............ C08L 67/00 (2013.01); C08L 67/02 (2013.01); C08L 79/00 (2013.01); C08L 79/02 (2013.01); C08L 79/04 (2013.01); C08L 2205/02 (2013.01); C08L 2205/025 (2013.01); C08L 2205/03 (2013.01); C08L 2205/035 (2013.01); C09D 5/00 (2013.01); C09J 5/00 (2013.01); C09J 5/06 (2013.01); C09J 133/02 (2013.01); C09J 133/04 (2013.01); C09J 133/06 (2013.01); C09J 133/08 (2013.01); C09J 133/10 (2013.01); C09J 161/26 (2013.01); C09J 161/28 (2013.01); C09J 167/00 (2013.01); C09J 167/02 (2013.01); C09J 179/00 (2013.01); C09J 179/02 (2013.01); C09J 179/04 (2013.01); C09J 2433/003 (2013.01); C09J 2461/003 (2013.01); C09J 2467/003 (2013.01); C09J 2467/006 (2013.01); Y10T 428/31786 (2015.04); Y10T 428/31794 (2015.04); Y10T 428/31797 (2015.04)

(56) References Cited

U.S. PATENT DOCUMENTS

| | | | |
|---|---|---|---|
| 2010/0055435 A1* | 3/2010 | Neubert | C09J 5/02 428/220 |
| 2010/0093913 A1* | 4/2010 | Jones | C09D 133/06 524/501 |
| 2014/0017467 A1* | 1/2014 | Inao | C08G 18/8029 428/214 |
| 2015/0111046 A1* | 4/2015 | Murota | C08J 7/123 428/446 |
| 2015/0344650 A1 | 12/2015 | Ouzineb et al. | |
| 2016/0312056 A1 | 10/2016 | Ouzineb et al. | |

* cited by examiner

POLYESTER/PRIMER/METAL COMPOSITE FILM THAT IS COHESIVE AND IMPERMEABLE TO GAS, METHOD FOR THE PRODUCTION THEREOF AND THE PRIMER UTILIZED IN SAID METHOD

FIELD OF THE INVENTION

The technical field of the invention is that of plastic films, in particular polyester films. More specifically, the invention relates to polyester/metal composite films (laminates), comprising a support formed by one or more polyester layers, said support being covered over at least one of its faces by a metallic film.

Even more particularly, the invention relates to a composite film containing an adhesion primer at the metal/polyester interface.

The production of these polyester/metal composite films, using at least one interfacial layer of at least one adhesion primer layer, is a further subject of the present invention, as well as the adhesion primer composition intended to coat the polymer films and making it possible, on the one hand, to improve the adhesion under conditions of high temperature and humidity between the film and a final covering of metallic type, and on the other hand to give the covered film good gas barrier properties.

The polyesters more specifically concerned are the semi-aromatic copolymers such as: polyethylene terephthalate (PET), polybutylene terephthalate (PBT), polytrimethylene terephthalate (PTT), polyethylene naphthalate (PEN); the aromatic copolymers such as Vectran.

TECHNOLOGICAL BACKGROUND

Plastic films, and in particular polyester films, are well known for the excellent properties thereof in terms of thermal stability, dimensional stability, chemical resistance and relatively high surface energy. These are very resistant materials and are particularly sought as supports for various coverings. Composite films comprising a plastic film as support and a covering have many applications: packaging, in particular food packaging, the protection of various objects (white goods, window panes, etc.), thermal insulation and damp protection in the building sector (vacuum insulation panel).

The food packaging applications of these polyester/metal composite films require, in particular, barrier properties to the gases oxygen and water vapour. But these barrier properties are not the only specifications required for these polyester/metal composite films. It is also important for them to be cohesive and not to delaminate, during handling, production, use and storage of the products for which they are intended.

Now, these composite films have the drawback of insufficient adhesion between the supports, in particular the polyester supports, and the metallic covering, thus rendering use thereof ineffective and/or unreliable and thus unsuitable. These problems of adhesion are particularly acute when the composite material is subject to high stresses. For example, in the field of food production, packaging can be subject to high temperature and humidity conditions in the hot filling, pasteurization or sterilization processes. It is known that, in these situations, the metallic coverings do not properly adhere to the polyester film, for example PET. This absence or this loss of adhesion means that the required barrier effect to oxygen and water vapour is lost, which causes deterioration of the food contained and a risk to the health of consumers.

In order to attempt to overcome this problem of the bond between the support and its metallic covering, several solutions have been proposed in the past. Thus physical (flame treatment, corona discharge, abrasive treatment) or physico-chemical treatments (acid treatments, grafting of chemical functions) at the surface of the films have been tested. As these various treatments have many drawbacks, the application of an intermediate coating was preferred for being more durable. This intermediate coating, also commonly called adhesion primer layer, is designed so as to have on the one hand, good adhesion to the support, and on the other hand, good adhesion to the metallic covering, and is conventionally based on acrylic (co)polymers. Placing this adhesion primer layer on the support is carried out by coating with an aqueous emulsion of acrylic (co)polymers.

Patent application PCT WO2014/102487A1 thus describes a PET film coated with an adhesion primer layer and covered with an aluminium layer obtained by evaporation under vacuum.

The coating of the adhesion primer is carried out using an acrylic latex A or an acrylic latex B (15 or 20% dry extract) cross-linked with or without Cymel 303 LF or Cymel 1123 crosslinking agent from Cytec Industries Inc.

The latex A is prepared according to Example 1 of patent EP0260203B1.

Its gel content is less than 50% by weight with respect to the total weight of acrylic and/or methacrylic polymer(s) and its content of acrylic and/or methacrylic acid copolymer(s) is at least 10% of the total weight of polymers.

The adhesion primer obtained from latex A makes it possible to obtain composite films with metal adhesions, under dry conditions (ambient temperature/hygrometry<50%), of at least 1000 gF/38 mm, while they are only 200, 280 or 480 gF/38 mm under wet conditions; in an adhesion test AT is measured according to the recommendations of AIMCAL TP-105-92 (Metallizing Technical Reference published by the Association of Industrial Metallizers, Coaters and Laminators).

Latex B, marketed under the name BT-67 by the company DSM, comprises particles of acrylic and/or methacrylic polymer(s) and has a gel content of at least 50% by weight with respect to the total weight of acrylic and/or methacrylic polymer(s).

The adhesion primer obtained from latex B makes it possible to obtain composite films with metal adhesions, under dry conditions, of at least 1000 gF/38 mm, while they are only 280, 400, 480 or 800 gF/38 mm under wet conditions, in the adhesion test AT.

The barrier effect with respect to O2 is given by a minimum P O2 (50% HR 23° C. in cc/m²/d) of 1 for latex B with L/R=80/20, and <0.3 for latex A with L/R=80/20.

The barrier effect with respect to $H_2O$ is given by a minimum P1120 (90% HR 38° C. in g/m²/d) of 0.27 for latex B with L/R=80/20, and <0.3 for latex A with L/R=80/20.

Patent application PCT WO2015092329A1 thus describes a PET film coated with an adhesion primer layer and covered with an aluminium layer obtained by evaporation under vacuum.

The coating of the adhesion primer is carried out using an acrylic latex B (15 or 20% dry extract) cross-linked with a Cymel 303 LF crosslinking agent from Cytec Industries Inc.

This latex B, marketed under the name BT-67 by the company DSM, comprises particles of acrylic and/or methacrylic polymer(s) and has a gel content of at least 50% by weight with respect to the total weight of acrylic and/or methacrylic polymer(s).

The adhesion primer obtained from latex B, according to latex dry extract/dry crosslinking agent ratios (L/R) of F1:100/0, F2:80/20, F3:75/25, F4:70/30 makes it possible to obtain composite films with metal adhesions, under dry conditions (ambient temperature/hygrometry<50%), of at least 1500 gF/38 mm, and 360 gF/38 mm under wet conditions, for F4, in an adhesion test AT measured according to the recommendations of AIMCAL TP-105-92 (Metallizing Technical Reference published by the Association of Industrial Metallizers, Coaters and Laminators).

The barrier effect with respect to O2 is given by a minimum PO2 (50% HR 23° C. in $cc/m^2/d$) of 1.76 for F4.

The addition of 5 and 10% of sulphonated polyester to the adhesion primers F2, F3, F4 leads to formulations F5 and F6, F7 and F8, F9 and F10, respectively.

F6 makes it possible to obtain composite films with metal adhesions of at least 1500 gF/38 mm, under dry conditions, and 1400 gF/38 mm under wet conditions.

The barrier effect with respect to O2 is given by a minimum PO2 (50% HR 23° C. in $cc/m^2/d$) of 0.86 for F6.

OBJECTIVES OF THE INVENTION

In this context, the invention aims to achieve at least one of the essential objectives listed below:
i further improve, in particular, the following specifications from the required product specification for composite films with polyester/primer/metallic covering, namely:
Adhesion of the metallic covering is maintained after heat treatment of the packaging (laminate comprising a metallized coated PET composite film and a polyolefin: polyethylene or polypropylene, film);
Adhesion of the covering is maintained under wet conditions: Wet Metal Adhesion greater than or equal to 500 gF/38 mm;
Gas barrier of the metallized coated PET composite film: Oxygen permeability (23° C., 50% relative humidity) less than or equal to 0.8 $cc/m^2/d$—Water vapour permeability (38° C., 90% relative humidity) less than or equal to 0.3 $g/m^2/d$;
ii providing a novel composite film comprising a polymer support, preferably polyester, at least one adhesive covering on at least one of the faces of the support, and at least one layer of cross-linked adhesion primer between the support and the covering, said film having improved barrier properties with respect to gases as well as for adhesion of the covering onto the support;
iii providing a novel composite film such as defined in the aforementioned objective and in which an interfacial cross-linking takes place be interposing the adhesion primer, in such a way as to promote adhesion between layers of materials of a different nature (for example polyester and metal) and to improve the gas barrier properties of the composite;
iv providing a novel composite film formed by a support (for example polyester), coated with at least one coat of adhesion primer and covered with at least one layer of metal and/or metal oxide, or at least one layer of ink, or a layer of adhesive;
v providing a novel polyester composite film meeting at least one of the aforementioned objectives and impervious to water;
vi providing a novel coating method for a support, preferably a polyester film, with an adhesion primer layer making it possible to obtain markedly increased adhesion properties between the support and the final covering;
vii providing a novel adhesion primer coating composition, which is universal with respect to the supports and the coverings to be firmly fixed together, and which moreover has good performance is terms of improvement in the adhesion properties and the gas barrier properties of the composite films produced by means of this adhesion primer;
viii providing a novel method for the production, in in-line or batch production, preferably in-line production, of a composite film comprising a polymer support, preferably polyester, at least one adhesive covering on at least one of the faces of the support, and at least one cross-linked adhesion primer layer between the support and the covering, said film having improved barrier properties with respect to gases as well as for adhesion of the covering onto the support;
ix proposing novel uses for a composite film formed by a support (for example polyester), coated with at least one adhesion primer layer and covered with at least one layer of metal and/or metal oxide, or at least one layer of ink, or a layer of adhesive, these novel uses being in particular packaging, preferably of food, decoration, printing and/or the protection of various supports.

BRIEF DESCRIPTION OF THE INVENTION

It is to the inventors' credit that, seeking to improve on the state of the art, they have developed a novel adhesion primer making it possible to achieve the aforementioned objectives, among others.

Thus, according to a first aspect, a purpose of the invention is a composite film comprising a polymer support, preferably polyester, at least one adhesive covering on at least one of the faces of the support, and at least one cross-linked adhesion primer layer between the support and the covering;
said film having improved barrier properties with respect to gases as well as for adhesion of the covering onto the support, characterized in that
this primer comprises at least one acrylic and/or methacrylic polymer P1, at least one acrylic and/or methacrylic polymer P2 different from P1, at least one crosslinking agent, and, preferably, at least one polyester that is soluble or dispersible in water;
P1 having a gel content TG1 greater than or equal to—in % dry weight and in an increasing order of preference—70, 80, 85, with respect to the total dry weight of P1;
P2 having a gel content TG2 less than or equal to TG1 and less than or equal to—in % dry weight and in an increasing order of preference—20, 40, 70 by weight with respect to the total dry weight of P2;
P1, having a surface-grafted free weak acid content greater than or equal to—in microequivalent per gram of polymer and in an increasing order of preference— 0.8; 0.9; 1.0;
the mass concentration of P2 is less than or equal to—in % dry weight with respect to the total dry mass of P1 and P2 and is given hereinafter in an increasing order of preference, 60, 50, 40.

The invention is thus based on a novel assembly of acrylic and/or methacrylic polymers, having different gel contents and situated in opposite domains, this novel assembly resulting, in a surprisingly unexpected way, in significant and concomitant improvements in the wet metal adhesion and gas barrier properties of the composite film.

According to a second aspect, a purpose of the invention is a production method, in in-line or batch production, preferably in-line, of the film according to the invention, this method being characterized by the implementation of the following steps:

a—utilizing a support as defined in the present description;

b—optionally, carrying out a physical surface treatment of said substrate;

c—optionally, stretching the film in a given direction or in 2 perpendicular directions;

d—coating at least one face of said support with a coating composition making it possible to obtain at least one layer of cross-linked adhesion primer as defined in the present description;

e—cross-linking the coating in order to obtain the layer of adhesion primer;

f—optionally, stretching the film in a given direction, the latter being perpendicular to that envisaged in step c in the case where this step is implemented with unidirectional stretching, or stretching in 2 perpendicular directions;

g—optionally, subjecting the coated and stretched support to a thermosetting;

h—applying a covering as defined in the present description on the layer of cross-linked adhesion primer;

i—subjecting the composite support/primer/covering assembly to heat curing, advantageously for 1 to 50 days, preferably 5 to 20 days, and even more preferably, for 8 to 15 days, at a temperature comprised between 10 and 120° C., preferably between 30 and 90° C., and even more preferentially, between 50 and 80° C., at ambient atmospheric pressure.

According to a third aspect, the invention relates to an adhesion primer coating composition, in particular utilized in the aforementioned method, characterized in that it comprises:

a mixture of at least two acrylic latexes L1, L2:

L1 comprising at least one acrylic and/or methacrylic polymer P1; P1 having a gel content TG1 greater than or equal to—in % by dry weight and in an increasing order of preference—70, 80, 85, with respect to the total dry weight of P1;

L2 comprising at least one acrylic and/or methacrylic polymer P2 different from P1, P2 having a gel content TG2 less than or equal to TG1 and less than or equal to—in % by dry weight and in an increasing order of preference—20, 40, 70 by weight with respect to the total dry weight of P2;

P1 having a surface-grafted free weak acid content greater than or equal to—in microequivalent per gram of polymer and in an increasing order of preference—0.8; 0.9; 1.0;

the mass concentration of P2 is less than or equal to—in % by dry weight with respect to the total dry mass of P1 and P2 and is given hereinafter in an increasing order of preference, 60, 50, 40;

at least one crosslinking agent;

preferably, at least one polymer that is soluble or dispersible in water;

and preferably water.

According to a fourth aspect, the invention relates to an article chosen from the group constituted by food and non-food packaging, films or foils for support protection and films or foils for thermal insulation and protection against humidity in the building sector, characterized in that it comprises at least one film according to the invention or such as obtained at the end of the method according to the invention.

DETAILED DESCRIPTION OF THE INVENTION

Definitions

Throughout the present description, the singular may denote either singular or plural.

The definitions given hereinafter by way of example can serve for the interpretation of the present description:

"polymer" may denote a homopolymer or equally well a copolymer, random or block

"approximately" or "substantially" plus or minus 10%, or even plus or minus 5%, relates to the unit of measurement used.

Composite Film

The composite film comprises:

A support constituted by at least two layers of polymer, preferably a polyester;

An intermediate layer formed by at least one layer of cross-linked adhesion primer present on at least one of the faces of the support;

A mono- or multi-layer covering, preferably comprising at least one metal, at least one metal oxide, silicon oxide, at least one ink and/or at least one adhesive.

The Support

The support is a solid support, preferably flexible. It can in particular be a polymer film. Quite particularly, a polyester film is used.

Thus, the film according to the invention is characterized by at least one of the following characteristics:

the polyester support is biaxially stretched;

the polyester support is selected from polyterephthalates or polynaphthalene-dicarboxylates of alkylene diol, preferably from ethylene glycol or butanediol-1,4 polyterephthalate and copolyesters containing at least 80 mole % of ethylene glycol terephthalate units;

the polyester support has a thickness less than or equal to 150 µm (micrometres), more preferably comprised between 4 µm and 100 µm, more preferably comprised between 4 µm and 40 µm, and even more preferably comprised between 4 µm and 15 µm;

the polyester support is constituted by at least two layers having different surface properties;

the dissymmetrical polyester support is produced according to the technique of coextrusion of at least two layers of polyester each containing different filler contents and if appropriate different fillers, the polyester used being preferentially the same for the two coextruded layers and the polyester layer that is to receive the primary layer having the lowest filler content;

the polyester support partially comprises recycled polyester originating from the support itself and/or from the support coated with a cross-linked adhesion primer such a defined in the present description and/or from the support coated with the aforementioned primer and covered with the covering as defined in the present description.

The polyester is advantageously a product of the polycondensation of one or more aromatic dicarboxylic acids (terephthalic acid, isophthalic acid for example) or derivatives thereof (halides, esters) with at least one alkylene glycol (ethylene glycol, propane-1,3-diol; butane-1,4-diol for example). Preferably, these are polyester derivatives of terephthalic acid or a mixture of terephthalic acid and another aromatic dicarboxylic acid (isophthalic acid for example), the terephthalic acid content of the mixture being sufficient for the polymer to be essentially crystalline after stretching.

Preferably, film-forming linear polyesters are used in the present invention, crystallizable by orientation and obtained in standard fashion from one or more aromatic dicarboxylic acids or derivatives thereof (lower aliphatic alcohol esters or halides for example) and one or more aliphatic diols (glycols).

The polyester constituting the base film can be selected from the polyesters that are usually used for obtaining bi-oriented semi-crystalline films. As examples of aromatic acids, phthalic, terephthalic, isophthalic, naphthalene-2,5-dicarboxylic, and naphthalene-2,6-dicarboxylic acids may be mentioned. These acids can be associated with a minor quantity of one or more aliphatic or cycloaliphatic dicarboxylic acids, such as adipic, azelaic, tetra- or hexahydro terephthalic acids. As non-limitative examples of aliphatic diols, ethylene glycol, propane-1,3-diol and butane-1,4-diol may be mentioned. These diols can be associated with a minor quantity of one or more, more carbon condensed diols, aliphatic (neopentyl glycol for example) or cycloaliphatic (cyclohexane dimethanol for example).

Preferentially, the crystallizable film-forming polyesters are polyterephthalates or polynaphthalene-dicarboxylates of alkylene diol and, in particular, ethylene glycol polyterephthalate (PET) or butanediol-1,4-diol or copolyesters containing at least 80 mole % of ethylene glycol terephthalate units. Advantageously, the polyester is an ethylene glycol polyterephthalate the intrinsic viscosity of which measured at 25° C. in ortho-chlorophenol is comprised between 0.6 dl/g and 0.75 dl/g.

The bi-orientated polyester films are, for example:
either constituted by polyethylene terephthalate;
or constituted by mixtures or not of polyethylene terephthalate copolyesters containing cyclohexyl-dimethylol units in place of the ethylene units;
or composed of mixtures or not of polyethylene terephthalate copolyesters with a polyester part having isophthalate units;
or constituted by several layers of polyesters the chemical nature of which is different, as previously described, obtained by coextrusion.

Specific examples of aromatic polyesters are in particular polyethylene terephthalate (PET), polyethylene isophthalate, polybutylene terephthalate, poly-(dimethyl-1,4-cyclohexylene terephthalate) and polyethylene-2,6-naphthalene dicarboxylate. The aromatic polyester can be a copolymer of these polymers or a mixture of these polymers with a small quantity of other resins, for example, non-limitatively, polybutylene terephthalate (PBT). Among these polyesters, polyethylene terephthalate (PET) and polyethylene-2,6-naphthalene dicarboxylate (PEN) are particularly preferred because they provide a good balance between physical properties, mechanical properties and optical properties. Preferably, the terephthalic acid content, expressed in moles percent moles of acid is at least 80. In preferred embodiments of the invention, the support is a polyethylene terephthalate PET film (for example with bi-axial orientation) or polyethylene naphthalate (PEN) or polybutylene terephthalate (PBT).

The support films utilized in the present invention can be oriented or not. Preferably, they are oriented. Advantageously, the polyester film utilized has bi-axial orientation.

The support according to the invention can be mono-layer, bi-layer or tri-layer. Each of the layers is composed of polyesters as defined above, preferably PET, PBT or PEN, and/or copolyesters described above and/or mixtures of polyesters/copolyesters. The layer(s) can be according to an M, MN, MNM or MNO structure where M is different from N and O, N is different from O. The main layer can be framed by one or two identical layers or not, in terms of thickness and/or composition. In this structure, the support can be symmetrical or dissymmetrical. One of these layers of the support intended to be covered by the coating composition described above has an average roughness Rz less than or equal to 0.25 micrometre and a roughness Ra (arithmetic mean deviation from the profile) less than or equal to 0.028 micrometres.

The other face of the support must have sufficient slipperiness properties in order to allow easy handling of the film, in particular its winding onto the different guide rollers during stretching or its winding onto itself. These slipperiness properties can be provided in different ways. One of the most usual procedures consists of incorporating inert solid fillers into the polyester before the transformation into film. These fillers are generally mineral fillers, such as for example, silica, titanium dioxide, zirconium dioxide, alumina, silica/alumina mixtures, silicates, calcium carbonate, barium sulphate. These fillers can also be constituted by polymer particles.

The volume median diameter of the fillers is generally comprised between 1 and 10 micrometres and preferably between 1 and 5 micrometres, more preferentially between 2-4 micrometres. The filler content of the film is usually comprised between 0.02% and 1% by weight with respect to the weight of the polyester.

A variant of the present invention consists of having a base polyester film having different surface properties, in particular roughnesses, on each of the two faces thereof. The different average roughnesses Rz can for example be equal to or greater than 0.35 micrometre on the dorsal face of the film, and less than or equal to 0.25 micrometre on the face of the base film intended to be coated with the composition described above.

Thus the polyester base film can be constituted by two layers having different surface properties, in particular roughnesses.

The support utilized for the present invention is preferably a polyester film, even more preferably a polyethylene terephthalate (PET) film, the thickness of which is preferably less than or equal to 150 μm (micrometres), more preferably comprised between 4 μm and 100 μm, more preferably comprised between 4 μm and 40 μm, and even more preferably comprised between 4 μm and 15 μm.

The support according to the invention can advantageously partially comprise recycled product from the support itself and/or from the coated support and/or from the coated and covered support. The support can contain up to 80% by weight of this recycled product with respect to the final total weight of the support. This makes it possible to reduce the costs of production of the film and to avoid economic losses due to non-use of the scrap from the support, the coated support and/or the coated and covered support.

The Adhesion Primer

P1-P2

This adhesion primer, preferably coated and crosslinked onto the support before the application of the covering, in the composite film according to the invention comprises at least one acrylic and/or methacrylic polymer P1, at least one acrylic and/or methacrylic polymer P2 different from P1, at least one crosslinking agent, and, preferably, at least one polyester that is soluble or dispersible in water.

P1 and P2 are each an acrylic and/or methacrylic polymer formed from acrylic and/or methacrylic monomers. The nature of these monomers can be different: hydrophobic, hydrophilic or partially hydrophilic.

Preferably, P1 or P2 comprises:
i. at least one partially hydrophilic monomer of alkyl acrylate, alkyl methacrylate or a mixture of the two, the alkyl portion of these monomers containing 1 or 2 carbon atoms;
ii. optionally, at least one hydrophobic monomer of alkyl acrylate, alkyl methacrylate or a mixture of the two, the alkyl portion of these monomers being linear or branched and containing at least 4 carbon atoms;
iii. at least one hydrophilic monomer.

The partially hydrophilic monomers can be alkyl acrylates or alkyl methacrylates where the alkyl portion has 1 or 2 carbon atoms. The preferred partially hydrophilic monomers are methyl acrylate, methyl methacrylate, ethyl acrylate and mixtures thereof, methyl methacrylate and ethyl acrylate being most preferred.

The quantity of partially hydrophilic monomers based on the total mass of monomer is preferably at least 10% by weight, more preferably at least 20% by weight, more preferably comprised between 20% and 30% by weight.

The hydrophobic monomers can be alkyl acrylates or alkyl methacrylates where the alkyl portion is linear or branched and contains at least 4 carbon atoms. The alkyl portion can be selected from the group constituted by n-butyl, iso-butyl, t-butyl, n-pentyl, n-hexyl, ethyl-2-hexyl, decyl, dodecyle, and octadecyl. The preferred hydrophobic monomers are butyl acrylate, butyl methacrylate and mixtures thereof.

The quantity of hydrophobic monomers based on the total mass of monomer is preferably at least 30% by weight, more preferably at least 50% by weight.

The hydrophilic monomers can be monomers copolymerizable with water-soluble alkyl acrylate or alkyl methacrylate monomers. The hydrophilic monomers can be selected from the mono-olefinic mono-carboxylic acids, the mono-olefinic di-carboxylic acids and mixtures thereof. Examples of hydrophilic monomers include, but are not limited to, acrylic acid, methacrylic acid, fumaric acid, maleic acid, itaconic acid, crotonic acid, an acrylic acid oligomer and mixtures thereof. The preferred acids are acrylic acid, methacrylic acid and mixtures thereof.

The quantity of hydrophilic monomers based on the total mass of monomers is at least 5% by weight, preferably at least 10% by weight.

The total mass of hydrophobic, hydrophilic and partially hydrophilic monomers described above preferably represents at least 60%, more preferably at least 75%, more preferably at least 80%, and even more preferably at least 90% of the total mass of the monomers constituting the acrylic and/or methacrylic polymer according to the invention. The mass percentage of different monomers of these hydrophobic, hydrophilic and partially hydrophilic monomers is preferably less than 20%, more preferably less than 10%, and even more preferably less than 5%, with respect to the total mass of the monomers. Preferably, the acrylic and/or methacrylic polymer according to the invention is constituted or essentially constituted by the hydrophobic, hydrophilic and partially hydrophilic monomers described above.

Advantageously, P1 and P2 may not contain monomers that are not compatible with food applications, for example monomers selected from the group constituted by monomers of the acrylamide type, aromatic dicarboxylic acid or ester type (in particular phthalic, isophthalic and terephthalic acid and the corresponding esters), styrene type, alkylphenol type or butadiene type. Preferably, P1 or P2 according to the invention comprises:
i. at least 20% of partially hydrophilic monomer(s) selected from methyl acrylate, methyl methacrylate, ethyl acrylate and mixtures thereof.
ii. at least 30% of a hydrophobic monomer of alkyl acrylate, alkyl methacrylate or a mixture of the two, the alkyl portion of these monomers being linear or branched and containing at least 4 carbon atoms;
iii. at least 5% of hydrophilic monomer(s) selected from acrylic acid, methacrylic acid and mixtures thereof;

For example, the composition of P1 or P2 can be (% by weight/dry weight):
25 to 80 of methyl methacrylate,
20 to 60 of ethyl acrylate,
5 to 20 of methacrylic acid,
0.1 to 10 of crotonic acid,
1 to 10 of vinyl acetate.

According to a preferred embodiment of the invention, P1 and P2 have the same qualitative and quantitative monomer composition.

Moreover, P1 and P2 have respectively, a gel content TG1 and TG2, with
TG2 less than or equal to TG1.
TG1 greater than or equal to—in % dry weight and in an increasing order of preference—70, 80, 85, with respect to the total dry weight of P1
TG2 less than or equal to—in % dry weight and in an increasing order of preference—20, 40, 70, by weight with respect to the total dry weight of P2.

The gel content of a polymer represents the insoluble content of the polymer, and it therefore makes it possible to characterize the degree of cross-linking of the polymer.

P1 and P2 are preferably presented in the form of polymer particles, the average diameter of which is for example less than or equal to 100 nm. Consequently, the particle surface of the polymer is very high.

Advantageously, P1 has a surface-grafted free weak acid content greater than or equal to—in microequivalent per gram of polymer and in an increasing order of preference—0.8; 0.9; 1.0; for example comprised between 1 and 2.

The surface-grafted free acid content of P2 is also greater than or equal to—in microequivalent per gram of polymer and in an increasing order of preference—0.8; 0.9; 1.0; for example comprised between 1 and 2.

According to a remarkable aspect of the invention, P1 and P2 have different surface-grafted free weak acid contents.

The mass concentration of P2 in the cross-linked adhesion primer is preferably less than or equal to—in % dry weight with respect to the total dry weight of P1 and P2 and given hereinafter in an increasing order of preference, 60, 50, 40.

Advantageously, the cross-linked adhesion primer layer(s) form(s) an interface the thickness of which is less than or equal to 200 nm (nanometres), more preferably comprised between 40 nm and 120 nm, more preferably comprised between 50 nm and 100 nm, and even more preferably comprised between 60 nm and 90 nm.

Crosslinking Agent

The cross-linked adhesion primer also comprises at least one crosslinking agent. By "crosslinking agent" is meant an additive added to the acrylic and/or methacrylic polymer and which generates a crosslinking reaction between the polymer chains, in particular by means of the hydroxy and carboxylic functions of the acrylic and/or methacrylic polymer. This crosslinking agent thus generates the formation of one or more uniform and continuous three-dimensional network(s).

Preferably, the crosslinking agent contains at least one resin, preferably at least one amine-based resin, and, even more preferentially at least one melamine-aldehyde resin, and, even more preferably, at least one benzoguanamine-aldehyde resin; and/or at least one resin derived from the aforementioned resins.

The amine-based resins are complex mixtures, having different functional sites, and they are conventionally synthesized by condensation of formaldehyde with an amine and subsequent alkylation of the resulting methylol groups with an alcohol.

Certain crosslinking agents used are melamine-aldehyde resins of Formula (I) or benzoguanamine-aldehyde resins of Formula (II):

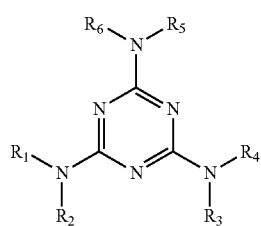
(I)

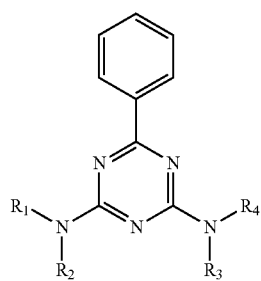
(II)

where the $R_1$ to $R_6$ groups are selected independently from each other from —H, —CH$_2$OH and —CH$_2$OR$_7$, $R_7$ being a $C_1$ to $C_5$ alkyl group.

The amine-based resins more preferentially used in the present invention are Cymel 1123® (a methylated and ethylated benzoguanamine-formaldehyde resin, 98% minimum solids) and Cymel 303LF® (a methylated melamine-formaldehyde resin having alkoxy reactive groups, 98% minimum solids), the respective chemical structures of which are given below:

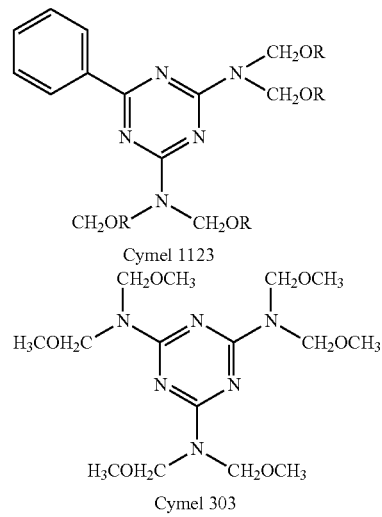
Cymel 1123

Cymel 303

(in which R can be CH$_3$ or C$_2$H$_5$)

These resins are marketed by Allnex.

The best performances are obtained with:
crosslinking agents selected from partially methylated, or better still, highly methylated, amine-based resins, and/or
crosslinking agents allowing rapid hardening at a temperature greater than 80° C., and/or
crosslinking agents having stability in long-term storage, preferably greater than 48 hours, after mixing thereof with the acrylic polymer in an aqueous environment.

The functional groups of the crosslinking agent and the carboxyl, hydroxyl, amide and/or methylol groups available on the acrylic and/or methacrylic polymers can react in the presence of an acid catalyst. The acid catalyst can be blocked or not. There may be mentioned, as acid catalyst suitable for the present invention without being limited thereto, the mineral acids, p-toluene sulphonic acid, dinonylnaphthalene disulphonic acid, dodecylbenzenesulphonic acid, oxalic acid, maleic acid, hexamic acid, phosphoric acid, phthalic acid, acrylic acid copolymerized in the polymer. The most commonly used catalyst is para-toluene sulphonic acid. The optimum quantity of catalyst depends on the targeted acidity of the acrylic and/or methacrylic polymer and hardening temperature.

The dry mass ratios (weight/weight) of P1 or P2 relative to the crosslinking agent are comprised between 95/5 and 50/50, more preferably between 90/10 and 65/45, and even more preferably between 80/20 and 60/40.

Optional polyester that is soluble or dispersible in water

Moreover, the adhesion primer of the composite film according to the invention comprises at least one polyester that is soluble or dispersible in water. In the present invention, by "polymer that is soluble or dispersible in water" is meant a polymer forming stable homogeneous dispersions with water.

Polyesters containing sulphonyloxy groups are particularly preferred within the framework of the invention. These groups are defined as groups of general formula

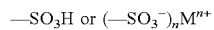

in which n has a value of 1 or 2 and M represents an alkali ion, an alkaline-earth ion or a quaternary ammonium.

The polyester containing sulphonyloxy groups can be obtained by polycondensation of one or more aromatic dicarboxylic acids with one or more aliphatic diols and at least one difunctional compound comprising at least one sulphonyloxy group.

Among the aromatic dicarboxylic acids that can be used, terephthalic acid, isophthalic acid, phthalic acid, naphthalene-1,4-dicarboxylic acid, oxy-4,4'-dibenzoic acid, bis(hydroxycarbonyl-4-phenyl)sulphone and di-hydroxycarbonyl-4,4'-benzophenone may be mentioned. These acids can be used alone or in mixtures. The aromatic dicarboxylic acid is preferably selected from terephthalic acid, isophthalic acid and mixtures thereof. Aliphatic dicarboxylic acids containing 3 to 15 carbon atoms can be combined with aromatic dicarboxylic acids, for example adipic acid, suberic acid, sebacic acid, succinic acid and dodecanedioic acid.

Among the diols that can be used, ethylene glycol, butane-1,4-diol, butane-1,3-diol, propane-1,3-diol, propane-1,2-diol, 2,2-dimethylpropane-1,3-diol, (or neopentyl glycol), pentane-1,5-diol, hexane-1,6-diol, cyclohexanedimethanol, diethylene glycol, triethylene glycol, tetraethylene glycol, pentamethylene glycol, hexamethylene glycol or decamethylene glycol may be mentioned. Preferably, the diol is selected from ethylene glycol and its oligomers, alone or mixed together and/or with other diols. The ethylene glycol oligomers are represented by the formula HO—$(CH_2$—$CH_2$—$O$—$)_n$H in which n is an integer comprised between 2 and 10.

Finally, the difunctional compound containing at least one sulphonyloxy group can be selected from the compounds comprising at least one sulphonyloxy group as defined above, and comprising at least two functional groups capable of reacting with the diacids and/or the diols by polycondensation. For example, the alkali metal salts of aromatic dicarboxylic acids with sulphonyloxy groups such as those of the sulphoterephthalic, sulphoisophthalic, sulphophthalic, 4-hydroxysulphonyl-naphthalene-2,7-dicarboxylic acids or derivatives thereof, and in particular esters thereof, may be mentioned.

For example, a polyester with sulphonyloxy groups that are soluble or dispersible in water according to the invention can correspond to the following chemical formula:

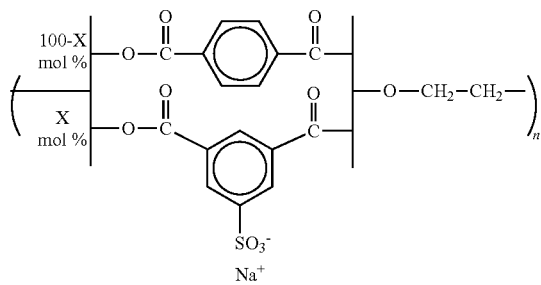

in which X has a value of 20.

Polyesters with sulphonyloxy groups that are soluble or dispersible in water have been described in the prior art, for example in patent application EP0260203B. Moreover, polyesters that can be used in the present invention are commercially available.

With regard to these optional polyesters with sulphonyloxy groups that are soluble or dispersible in water, the film according to the invention is characterized by one and/or the other of the following characteristics:

i the polyester that is soluble or dispersible in water bears sulphonyloxy groups and is preferably selected from the group comprising—or better still constituted by— copolyesters derivatives of at least one aromatic dicarboxylic acid and at least one aliphatic diol and containing a plurality of sulphonyloxy groups of general formula (I):

in which n is equal to 1 or 2, M represents a hydrogen atom, an alkali metal or alkaline-earth metal, an ammonium cation or a quaternary ammonium cation;

ii the content of polyester that is soluble or dispersible in water is comprised between 2% and 30% by weight, more preferably between 5% and 20% by weight, even more preferably between 8% and 12% by dry weight, relative to the dry weight of acrylic and/or methacrylic polymer.

The Covering

This covering can be of different types, for example: metal, metal oxide, metal sulphide, alloy, silicon oxide, ink, or adhesive, and combinations thereof, in one or more layers.

According to the invention and with regard to the covering of the composite film, the latter is characterized by at least one of the following characteristics:

the covering contains at least one metallic layer composed of at least one metal and/or at least one metal oxide and/or one silicon oxide, the metal being preferably selected from aluminium, copper, chrome, nickel, silver; aluminium being particularly preferred;

the thickness of the covering is situated between 0.01 and 0.06 micron.

Heat Cured Film

According to a preferred characteristic of the invention, the composite film was cured for 1 to 50 days, preferably 5 to 20 days, and even more preferentially, 8 to 15 days, at a temperature comprised between 10 and 120° C., preferably between 30 and 90° C., and even more preferentially, between 50 and 80° C., at ambient atmospheric pressure.

Specific Surface Roughnesses

According to another remarkable characteristic of the invention, the composite film is characterized in that the average roughness Rz of the support, on its face(s) bearing a covering, is less than or equal to 0.40 micron and in that this face does not contain on average more than 20 peaks having a height equal to or greater than 1 micron and not more than 150 peaks having a height comprised between 0.4 and 1 micron, per square millimetre, when the thickness of the primer layer is less than 0.6 micron.

The roughness of the face(s) of the support covered with at least one cross-linked adhesion primer layer is also an important parameter that is advantageous for the invention. Thus, this roughness is such that the face(s) of the support covered with primer does not contain on average more that 20 peaks having a height equal to or greater than 1 micron and not more than 100 peaks having a height comprised between 0.4 and 1 micron per square millimetre.

Gas and Adhesion Barrier

It has been discovered that, surprisingly, the composite film according to the invention, once heat cured (for example 10 days at 60° C.), has both good adhesion properties between the support and the covering in dry and wet conditions, but also very good barrier properties, in particular to oxygen and water vapour. These good properties are advantageously maintained in high temperature and wet conditions.

Thus, the composite film according to the invention has at least one of the following characteristics:
- a permeability to oxygen, measured at 23° C. under 0% relative humidity, expressed in $cm^3/m^2/24$ h and given below in an increasing order of preference, less than or equal to 0.9; 0.8; 0.7; 0.6;
- a permeability to water vapour, measured at 38° C. under 90% relative humidity, expressed in $g/m^2/24$ h and given below in an increasing order of preference, less than or equal to 0.5; 0.4; 0.3;
- an adhesion in dry conditions, measured in a test AT, greater than or equal to—in gf/38 mm and in an increasing order of preference, 1000; 1200; 1300.
- an adhesion in wet conditions, measured in a test AT, greater than or equal to—in gf/38 mm and in an increasing order or preference, 300; 400; 500.

The composite film according to the invention has increased barrier properties, in particular barrier properties to oxygen. Due to the composition of the primer P1-P2, of the crosslinking agent, and, preferably, to the low roughness of the coated support, the barrier property to oxygen of the composite film surprisingly reaches significantly low levels.

Laminate Comprising the Composite Film of the Invention

In an embodiment variant, the composite film according to the invention is characterized in that it is firmly fixed with at least one other film, selected from the films according to the invention, plastics (e.g. polyolefins; polyethylene, polypropylene etc.), metals and equivalents, oxides thereof, in order to form a laminate.

Manufacture of the Composite Film

The method for the manufacture in line or in batch, preferably in line, in particular of the film according to the invention comprises the following steps:
a—utilizing a support as defined above;
b—optionally, carrying out a physical surface treatment of said support;
c—optionally, stretching the film in a given direction or in 2 perpendicular directions;
d—coating at least one face of said support with a coating composition making it possible to obtain at least one layer of cross-linked adhesion primer as defined in the present description;
e—cross-linking the coating in order to obtain the layer of adhesion primer;
f—optionally, stretching the film in a given direction, the latter being perpendicular to that envisaged in step c in the case where this step is implemented with a unidirectional stretching, or stretching in 2 perpendicular directions;
g—optionally subjecting the coated and stretched support to a thermosetting;
h—applying a covering as defined in the present description on the layer of cross-linked adhesion primer;
i—subjecting the composite support/primer/covering assembly to a heat curing, advantageously for 1 to 50 days, preferably, 5 to 20 days, and, even more preferentially, for 8 to 15 days, at a temperature comprised between 10 and 120° C., preferably between 30 and 90° C., and, even more preferentially, between 50 and 80° C., at ambient atmospheric pressure.

Step (a)

The support as described above is preferably a polyester film (e.g. PET).

Step (b)

In order to further improve the adhesion properties of the covering on the coated support, the method can comprise an optional step (b) consisting of carrying out a physical surface treatment of said support. This treatment is carried out before coating (step d). All or part of the surface of the support can be treated. The physical treatment can be chosen from a treatment by an electric discharge of the corona type and a treatment of plasma type. Said corona type treatment is a corona discharge under ambient air at atmospheric pressure or under gases at high partial pressures, preferably between 100 mbar and 3000 mbar, even more preferably at atmospheric pressure.

Step (d)

Step (d) of the method according to the invention consists of coating at least one face of said support with the coating composition as described above.

Said support advantageously has on the face intended to be coated, an average roughness Rz less than or equal to 0.40 micrometre and, preferably, a roughness Ra (arithmetic mean deviation from the profile) less than or equal to 0.028 micrometre. The other face of the support must have sufficient slipperiness properties in order to allow easy handling of the film, in particular its winding onto different guide rollers during stretching or its winding onto itself.

The deposition of the coating composition onto the support, preferably onto a polyester film, can be carried out by the different techniques known to a person skilled in the art. Thus, the composition can be deposited by gravity from a slot-orifice coater, or by passing the film through the dispersion, by means of transfer rollers, by in-line coating with a reverse gravure method. According to a preferred embodiment of the invention, the coating of the support is carried out in line, which not only allows simplification of industrial implementation but also a considerable saving of time and money.

The thickness of the coating is a function of the kinetics of cross-linking of the latter. It depends in particular on the quantity of coating deposited, the dry extract of the dispersion used, the percentage of cross-linking agent included in the dispersion and the conditions of drying of the coating.

Step (d) of deposition by coating of the coating composition can take place before any stretching of the support, between the two operations of unidirectional stretching of the support or after the two operations of directional stretching, this last option being less satisfactory. According to a preferred embodiment of the method according to the invention, step (d) of deposition of the coating composition is carried out between the two optional steps (c) & (f) of unidirectional stretching.

Optional Stretching Steps (c) & (f)

The support is stretched in one or two perpendicular directions. When it is stretched in both directions, this is called two-dimensional stretching, which may be firstly longitudinal (Longitudinal Stretching LS, degree of LS≥3.0) followed by transverse stretching (Transverse Stretching TS, degree of TS≥3.5). The degree of planar stretching (defined as the product of the degree of longitudinal stretching and the degree of transverse stretching, regardless of the order of these stretching operations) is for example comprised between 1 and 20, usually greater than 12

The sequences of stretching can be different depending on the machines used, without affecting the properties obtained by means of the invention. For example, so-called reverse-sequence machines or multistep machines, machines with alternating sequences or machines with simultaneous stretching, etc., may usefully be used. The stretching temperature is for example comprised between the glass transition temperature Tg of the support and a temperature at maximum equal to Tg+60° C. in the longitudinal direction as well as in the transverse direction. Longitudinal stretching is carried out for example from 3 to 6 times and transverse stretching for example from 3 to 5 times.

Optional Thermosetting Step (g)

In general, following the operation or operations of stretching, the film undergoes a step (g) of thermosetting. As an example, for PET, thermosetting is carried out between 180° C. and 250° C. (for example at 240° C.) for 1 to 60 seconds for example and then at a lower temperature in order to stabilize the film.

Cross-Linking Step (e)

After deposition of the coating, cross-linking takes place in order to form an adhesion primer layer. The cross-linking takes place after deposition of the coating and is caused by drying of the coating, intended to remove the water from the aqueous dispersion.

In the case of in-line coating, it is not generally necessary to carry out a specific drying step: drying is carried out during the stretching steps (c) and/or (f) and/or during the thermosetting step (g). However, it can also be envisaged in the present invention to implement a drying step by heat treatment prior to stretching and/or thermosetting At the end of cross-linking step (h), an adhesion primer layer is obtained, of which the initial content of surface free acid functions with respect to the total weight of polymer has significantly reduced following the reaction between the cross-linking agent and the functions of carboxylic type present in the acrylic and/or methacrylic polymer contained in the coating composition.

These free acid functions originate from the acrylic and/or methacrylic polymer contained in the coating composition.

The coating is such that the adhesion primer layer obtained on the support has an optimum thickness of 80 nm±20 nm, which corresponds to 0.08 g/m² of support.

The thickness of the coating can in particular vary with:
the solid content of the coating composition, and/or
the application method and the size of the rollers used for application of the coating composition onto the support.

Step (h) Covering

In order to obtain a composite film, a covering capable of reacting with the adhesion primer layer is applied on the support covered with the layer of the adhesion primer according to the invention. Application of the covering consists for example of a metallization, preferably a metallization under vacuum. It consists of vaporizing under vacuum for example at a pressure of approximately $4 \times 10^{-4}$ mbar, a thin metallic layer on the film. Evaporation is carried out typically in ceramic crucibles heated by the Joule effect to approximately 1400° C. to 1500° C. The metal is then sprayed onto the surface of the film to be covered which is in contact with a cooled roller called a coating roller. The metal then condenses immediately, thus forming a thin layer from 20 nm to 100 nm. During metallization, the thickness of the metal layer is monitored by measuring the optical density (OD, measurement of the transparency of the film).

Coating Primer Composition

The coating composition of adhesion primer comprises:
a mixture of at least two acrylic latexes L1, L2:
  L1 comprising at least one acrylic and/or methacrylic polymer P1; P1 having a gel content TG1 greater than or equal to—in % by dry weight and in an increasing order of preference—70; 80; 85, with respect to the total dry weight of P1;
  L2 comprising at least one acrylic and/or methacrylic polymer P2 different from P1; P2 having a gel content TG2, less than or equal to TG1 and less than or equal to—in % by weight dry and in an increasing order of preference—20; 40; 70, by weight, with respect to the total dry weight of P2;
  P1 having a surface-grafted free weak acid content greater than or equal to—in microequivalent per gram of polymer and in an increasing order of preference—0.8; 0.9; 1.0;
  the mass concentration of P2 is less than or equal to—in % by dry weight with respect the total dry mass of P1 and P2 and is given hereinafter in an increasing order of preference, 60, 50, 40;
at least one cross-linking agent;
preferably, at least one polyester soluble or dispersible in water.
and preferably water.

P1, P2, TG1, TG2 are described in more detail above.

This adhesion primer composition is characterized by at least one of the following characteristics:
the latexes L1 L2 each have a dry extract from 10% to 30% by weight, and preferably from 15% to 25% by weight;
the weight ratio of acrylic and/or methacrylic polymers/hydrodispersible copolyester, in aqueous solution, is from 99/1 to 50/50 and is preferably situated between 97/3 and 80/20.

This composition can be obtained by mixing the acrylic and/or methacrylic polymers (for example P1, P2) in a dispersion liquid, preferably in water. The composition is then presented in the form of an aqueous dispersion.

Some of the acrylic latexes capable of being used in the present invention are commercially available.

This coating composition is particularly useful in that it can be used as adhesion primer layer between a polymer film and a metallic covering, and that, quite unexpectedly, it confers on the composite film obtained not only adherence properties that are as good, or even better than in the prior art, but also substantially improved barrier properties.

Applications of the Composite Film According to the Invention—Articles Originating from these Applications The applications of the composite films according to the present invention are in particular food packaging, medical packaging and so-called industrial applications, for example thermal insulation in buildings (e.g. vacuum insulation panels).

Regarding packaging, it can be the packaging of food products from their site of manufacture or production to their arrival at the final consumer. These films are quite especially developed in order to ensure a barrier either to gas (oxygen, nitrogen, helium, water vapour, etc.) or to odours. Filling the food packaging can be carried out hot. Not only the barrier properties of the materials used, but also the retention of these properties, i.e. of the support/covering adhesion even under high temperature conditions and under moist conditions are therefore essential.

The laminates and complexes produced from the composite film according to invention and from any other raw materials in whatever form, are articles benefiting from the advantageous properties of said composite film. These articles are an integral part of the present invention.

Tests

I. Gel Content

Measuring the gel content of the particles of acrylic and/or methacrylic polymers is carried out using a Soxhlet extractor with the following technique: 1 g of acrylic and/or methacrylic polymer is placed in a cellulose capsule which has been weighed beforehand. A flask is filled with 100 ml of tetrahydrofuran (THF) solvent and left under a nitrogen atmosphere. The system is heated to 95° C. using an oil bath. At 95° C., the nitrogen flow is reduced and aluminium sheets are placed around the glass column so as to keep it hot and to prevent condensation of the THF on the walls. Extraction begins when the THF evaporates and when it falls into the capsule solubilizing the acrylic and/or methacrylic polymer that is not crosslinked. The extraction lasts 7 hours. Then the capsule is dried at 105° C. overnight. Measurement of the gel content (G) is calculated with the following equation:

$$G(\%) = [(Mf-Mc) \times 100]/Mi$$

in which:
Mf is the final mass, i.e. after drying, of the capsule and of the non-soluble polymer,
Mc is the mass of the capsule, and
Mi is the mass of the dried polymer.

II. Roughness

Measurements of roughness are carried our using a Hommel T8000 roughness meter. This measurement makes it possible to obtain the surface topography of a polyester film using a touch probe. The probe used is of the TKL100 short tip at 90°, with a contact pressure of 0.8 mN and a tip diameter of 0.5 micrometres.

This point sweeps the surface of the film according to the following conditions: probe length 1.75 millimetres, step between measurements 20 micrometres, probe speed 0.1 millimetres per second, filter ISO 11562, number of acquisition points per probe 8000, number of passes 40. Sweeping the surface thus makes it possible to measure the Rz and Ra. The Rz (equation 1) being the arithmetic mean of the isolated roughness depths $R_{z1}$ at $R_{z5}$ of five fractions of successive measurements $l_r$ of the filtered roughness profile.

$$R_z = 1/5(R_{z1}+R_{z2}+R_{z3}+R_{z4}+R_{z5}) \quad \text{Equation 1:}$$

The Ra (equation 2) is the arithmetic mean of the deviations of the filtered roughness profile, from the average line within the measurement trajectory $l_r$.

$$R_a = \frac{1}{l_r}\int_0^{l_r} |Z(X)| dX \quad \text{Equation 2}$$

III. Permeability $O_2/H_2O$

Measurements of permeability to oxygen are carried out according to standard ASTM F-1927 "Standard Test Method for determination of Oxygen Gas Transmission Rate, Permeance at Controlled Relative Humidity through Barrier Materials using a Coulometric Detector", the results are expressed in $cc/m^2/d$ (cubic centimetre per square metre and per day). Measurements of the permeability to water vapour are carried out according to standard ASTM F-1249 "Standard Test Method for Water Vapor Transmission Rate through Plastic Film and Sheeting using a Modulated Infrared Sensor", the results are expressed in $mg/m^2/d$ (milligram per square metre and per day).

IV. Permeability $O_2/H_2O$ The adhesion properties are measured according to the adhesion test AT.

The adhesion test AT is carried our according to the AIMCAL TP-105-92 recommendations (Metallizing Technical Reference published by the Association of Industrial Metallizers, Coaters and Laminators). It is described for metal, but is suitable for other types of covering. The test AT makes it possible to measure the adhesion strength between the metal and the PET using a dynamometer. The test is carried out in dry and wet conditions. The metallized support, preferably a metallized PET film, is sealed with a treated polyethylene film (DAP). A specimen 38 mm wide is then cut from the sample and will be used for the measurement. The specimen is tested under tension using an INSTRON dynamometer in order to determine the strength to be applied in order to tear the aluminium layer from the coated film. The support is fixed to the lower jaw and the and the DAP film to the upper jaw. In this way, tension is exerted at 180° at a rate of 100 mm/min on the sealed area and the force necessary for delamination is measured (standard followed NF T 54-122, "Assessment of the quality of weld or bond between two sheet elements by means of a tensile test."). The result of this test AT is an adhesion strength expressed in gF/38 mm. For each sample, a minimum of 3 specimens is tested in this way, and each film is cut into six large strips the optical density of which is measured in order to find the quantity of metal deposited. The force needed for the dynamometer to tear the metal layer of the PET film is measured under dry and wet conditions. For the measurement under wet conditions, the operator applies a small quantity of water inorder to simulate a wet environment.

V. Residual Content of Free Acid Functions

The residual content of free acid radical function on the surface can be measured with the following conductivity measurement assay: The main objective of the conductometric assays is to evaluate the quantity of free acid functions available on the acrylic and/or methacrylic polymer. There are two types of charge: "strong acid" charges and "weak acid" charges. The "strong acid" charges are in particular the sulphate $SO_4^{2-}$ charges. The "weak acid" charges are the carboxylic $COO^-$ charges supplied by the acrylic and/or methacrylic acid. The conductometric determination is carried out on a latex washed beforehand, the solids content of which is accurately known. The crude latex is diluted to reach a solids content below 5%. This diluted latex is then washed on mixed ion-exchange resins, i.e. anionic and cationic. At the end of this step, the counter-ions of the positive charges are hydroxyl ions and those of the negative charges are protons. This treatment makes it possible to remove the ionic species that are not grafted to the surface of the particles (charges originating from the initiator or molecules of surfactant, free or weakly adsorbed at the surface of the particles). The determination consists of ascertaining the neutralization minima of the acid functions using a conductometric probe and takes place in two steps. The first step consists of determining the strong acid charges ($SO_4^{2-}$) by adding a sodium hydroxide solution. Once the neutralization of these charges has ended, an excess of sodium hydroxide is added, in order to convert the carboxylic acid functions present at the surface into carboxylate ions. The carboxylic charges are not in fact directly detectable with sodium hydroxide, owing to their low $pK_A$. The second step then consists of assaying the latex in return with hydrochloric acid: firstly the excess hydroxyl ions $OH^-$ are neutralized, then the weak acid charges $COO^-$. The diluted latex is brought into contact with the resin and stirred for 30 to 40 minutes. It is then filtered on quartz wool in order to remove the resin and its conductivity is measured. The operation is repeated as many times as necessary, until the conductivity is constant. The successive washings are in fact accompanied by a decrease in conductivity and washing is regarded as ended when the conductivity stabilizes. The solids content of the washed latex is then determined accurately, as the successive washings tend to dilute the latex. In addition, the granulometry of the washed latex is verified, to make sure that it has not changed during the washings. A certain quantity of latex is weighed accurately and diluted in 50 mL of demineralized water. The mixture is stirred and degassed for 10 minutes with a nitrogen flow, in order to remove all traces of carbon dioxide dissolved in the water, which could distort the assay by causing the release of carboxylic functions. Scavenging with nitrogen is also maintained during the assays. A preliminary assay makes it possible to evaluate the quantity of latex to use, taking into account the concentration of the titrating solutions (i.e. $\sim 10^{-2}$ mol·L$^{-1}$), in order to obtain the greatest accuracy. Three assays are then carried out to ensure the reliability of the results. The assays are monitored with a conductivity meter equipped with a platinum electrode connected to a central acquisition unit. Based on the determination curves, it is then possible to calculate the concentration of the charges in the latex from the following equations:

$$C_{strong\ acid\ charges} = \frac{[NaOH] \times V_{NaOH}}{m_{latex} \times TS} \times 10^3$$

$$C_{weak\ acid\ charges} = \frac{[HCl] \times V_{HCl}}{m_{latex} \times TS} \times 10^3$$

in which:
$C_{charges}$ denotes the concentration of the charges in the latex, expressed in microequivalent per gram of polymer (µeq/gpolymer),
[NaOH] and [HCl] represent respectively the concentration of sodium hydroxide and hydrochloric acid in the titrating solutions, expressed in mol·L$^{-1}$,
$V_{NaOH}$ and $V_{HCl}$ represent respectively the volume of titrating solutions of sodium hydroxide and hydrochloric acid used for the assay, expressed in litres,
$m_{latex}$ represents the weight of latex, expressed in grams, and
TS represents the solids content in the diluted latex.

VI. Thickness of Primer Layer

Measurement of the adhesion primer layer or of the coating support of the adhesion primer layer can be carried out using the TOF-SIMS (Time of Flight-Secondary Ion Mass Spectrometry) method where 2 types of measurement have been carried out.
1. A qualitative distribution profile of the depth from the surface to the core of the support under different conditions. This makes it possible to estimate the thickness of the adhesion primer layer in erosion time and to perform a comparative analysis between different films of the same nature.
2. A measurement of the thickness of the film by profilometer reading of a crater obtained on a reference from (with stopping of ionic erosion after removal of the covering), and calculation of the erosion rate from the corresponding erosion time for removing it.

Starting from measurement No. 2, a correlation between the erosion time/erosion rate and the thickness can be established. Thus, the thickness can be estimated over all of the supports where an erosion time was measured (measurement No. 1).

The surface analysed is 100 µm×100 µm at the centre of the larger erosion crater (approximately 600 µm×600 µm), in order to minimize the edge and redeposition effects. Each point of the profiles is obtained from a mass spectrum, which allows elemental analysis throughout the depth probed. Thus, each element or contaminant present at the surface, at the core of the layers or at the interfaces is automatically detected. The following major elements are detected indiscriminately in the support and in the adhesion primer layer: carbon (C) and oxygen (O). In the adhesion primer layer, traces of sulphur (S) are detected. The ionic species retained for the depth distribution profiles are therefore the following elements: C, O and S.

EXAMPLES

Example 1: Improvement in the Barrier Performance of Latex 1 and Latex 2 by Increasing the Content of Crosslinking Agent and Adding a Water-Soluble Polyester In the first part of this experimental design, an acrylic and methacrylic polymer having a gel content greater than 85% and a surface-grafted free weak acid content less than or equal to 2 micro equivalent per gram of polymer was used. It is in the form of particles the average diameter of which is less than 100 nm in dispersion in water (0-15 or 20% dry extract). This polymer is denoted "Latex 1" below. This was prepared according to the standard method of radical polymerization in the aqueous phase. It has the following monomer composition (% by weight/total weigh of the monomers):
30 of methyl methacrylate
60 of butyl acrylate
10 of methacrylic acid The crosslinking agent used is Cymel 303 LF, denoted "Crosslinking agent X" below.

To the compositions containing Latex 1 and Crosslinking agent X was added a water-soluble polyester carrier of sulphonyloxy groups of the following formula:

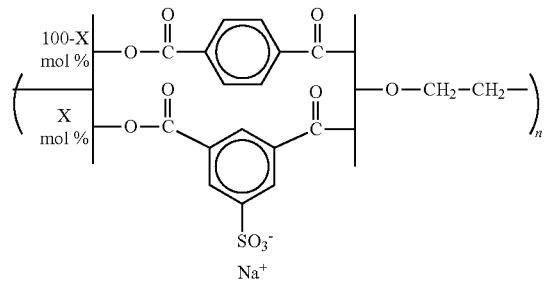

in which X has a value of 20. This polymer is denoted "PES" below.

Five coating compositions F1, F2, F3, F4, F5 were prepared:
F1: Latex 1 only
F2: Latex 1+Crosslinking agent X—latex/crosslinking agent mass ratio of 80/20 (dry extract/dry extract).
F3: Latex 1+Crosslinking agent X—latex/crosslinking agent mass ratio of 70/30 (dry extract/dry extract).
F4: Latex 1+Crosslinking agent X—latex/crosslinking agent mass ratio of 80/20 (dry extract/dry extract).
+10% PES by dry weight, relative to the dry weight of Latex 1
F5: Latex 1+Crosslinking agent X—latex/crosslinking agent mass ratio of 70/30 (dry extract/dry extract).
+10% PES by dry weight, relative to the dry weight of Latex 1

In the second part of this experimental design, an acrylic and methacrylic polymer having a gel content less than or equal to 70% and a surface-grafted free weak acid content less than or equal to 2 micro equivalent per gram of polymer was used. It is also in the form of particles the average diameter of which is less than 100 nm in dispersion in water (0-15 or 20% dry extract). This polymer is denoted "Latex 2" below. This was prepared according to the same method and the same monomer composition as "Latex 1".

Crosslinking agent X and PES were added to this latex.

Five other coating compositions F6, F7, F8, F9, F10 were prepared:

F6: Latex 2 only
F7: Latex 2+Crosslinking agent X—latex/crosslinking agent mass ratio of 80/20 (dry extract/dry extract).
F8: Latex 2+Crosslinking agent X—latex/crosslinking agent mass ratio of 70/30 (dry extract/dry extract).
F9: Latex 2+Crosslinking agent X—latex/crosslinking agent mass ratio of 80/20 (dry extract/dry extract). +10% PES by dry weight, relative to the dry weight of Latex 1
F10: Latex 2+Crosslinking agent X—latex/crosslinking agent mass ratio of 70/30 (dry extract/dry extract). +10% PES by dry weight, relative to the dry weight of Latex 1

These compositions were deposited on a PET film by an in line heliographic coating method. The rotating helio roller carries the coating composition onto the PET film. Large or small heliogravure rollers can be used for in line coating. The coating compositions was dried beforehand by means of infrared radiation at a wavelength of the order of 2 μm before entering the oven. This drying is then completed while the coated film passes into the oven.

The PET film on the coated face is called rough, i.e. it has an average roughness Rz greater than 0.25 micrometres and a roughness Ra (arithmetic mean deviation from the profile) greater than 0.028 micrometres.

The PET film coated with a layer of adhesion primer was then covered with a layer of aluminium obtained by evaporation under vacuum (at $4 \times 10^{-4}$ mbar) during a conventional industrial metallization method (TopMet machine from Applied Materials). During metallization, the thickness of the metal layer was controlled by measuring the transparency of the film translated in terms of optical density (OD). The OD is comprised between 2.4-3.0 which corresponds to a thickness of the metal layer of 30 to 60 nm.

The adhesion properties of the aluminium metallic covering under dry and wet conditions, and the oxygen transmission rate ($PO_2$) of the material obtained were assessed as described above and the results are given in Table 1.

TABLE 1

| | | $PO_2$ (cm3/m2/d) | Dry metal adhesion (gF/38 mm) | Wet metal adhesion (gF/38 mm) |
|---|---|---|---|---|
| Latex 1 | F1 | 2.85 | 60 | 4 |
| | F2 | 1.47 | >500 | 200 |
| | F3 | 1.72 | >500 | 360 |
| | F4 | 0.90 | >500 | 300-500 |
| | F5 | 0.97 | 700 | 200 |
| Latex 2 | F6 | 3.96 | 153 | 140 |
| | F7 | 0.70 | 98 | 26 |
| | F8 | 0.59 | 92 | 21 |
| | F9 | 0.70 | 101 | 39 |
| | F10 | 0.59 | 102 | 41 |

It is noted that the increase in the concentration of crosslinking agent tends to increase the barrier rating of the material for Latex 1 and Latex 2. Latex 2 clearly shows a greater improvement. However, it is observed that the increase of crosslinking agent does not produce improved metal adhesion under dry and wet conditions for Latex 2, on the contrary a decrease is observed. With respect to Latex 1, a net increase of metal adhesion is observed with a maximum for the formulation F4. However, the level of permeability to oxygen remains insufficient considering the objectives of the present invention.

Example 2: Improvement in the Barrier Performance by Combining Latex 1 and Latex 2 in the Presence of a Crosslinking Agent and Water-Soluble Polyester with a Sulphonyloxy Group In the following experimental design Latex 1 and Latex 2 were combined adding Crosslinking agent X and the polymer denoted "PES". This formulation was tested on a so-called rough film and a smooth film i.e. an average roughness Rz less than or equal to 0.25 micrometres and a roughness Ra (arithmetic mean deviation from the profile) less than or equal to 0.028 micrometres.

These two conditions are also compared to the formulations using Latex 1 as the only coated acrylic compound, also on a film called rough and a film called smooth.

4 coating compositions F11 to F14 were prepared:

F11: Latex 1+Crosslinking agent X—latex/crosslinking agent mass ratio of 70/30 (dry extract/dry extract)+10% PES by dry weight, relative to the dry weight of Latex 1 Coated on a so-called rough polyester film
F12 Latex 1+Crosslinking agent X—latex/crosslinking agent mass ratio of 70/30 (dry extract/dry extract)+10% PES by dry weight, relative to the dry weight of Latex 1 Coated on a so-called smooth polyester film
F13 Latex 1+Latex 2–latex 2/(Latex 1+Latex 2) mass ratio 30% by weight dry/dry+Crosslinking agent X—Latex/crosslinking agent mass ratio of 70/30 (dry extract/dry extract)+10% PES by dry weight, relative to the dry weight of Latex 1 Coated on a so-called rough polyester film
F14: Latex 1+Latex 2–latex 2/(Latex 1+Latex 2) mass ratio 30% by weight dry/dry+Crosslinking agent X—Latex/crosslinking agent mass ratio of 70/30 (dry extract/dry extract)+10% PES by dry weight, relative to the dry weight of Latex 1 Coated on a so-called smooth polyester film These compositions were used as described in Example 1 and the properties of the materials obtained were measured in the same manner; measurements of water permeability and measurements of roughness of the coated film before metallization were also carried out. The results are given in Table 2.

TABLE 2

| | F11 | F12 | F13 | F14 |
|---|---|---|---|---|
| Rz (μm) | 0.33 | 0.23 | 0.33 | 0.23 |
| Ra (μm) | 0.037 | 0.027 | 0.037 | 0.027 |
| $PO_2$ (cm3/m2/d) | 0.87 | 0.70 | 0.70 | 0.50 |
| $PH_2O$ (g/m2/d) | 0.21 | 0.19 | 0.20 | 0.17 |
| Dry metal adhesion (gF/38 mm) | >500 | >500 | >500 | >500 |
| Wet metal adhesion (gF/38 mm) | 100 | 112 | 80 | 162 |

It can be observed that the compositions F11 and F12 show acceptable barrier and dry metal adhesion performances, it is seen that the use of a less rough film tends to reduce the level of permeability to oxygen. The addition of Latex 2 into the composition made it possible to achieve even more favourable barrier ratings and to achieve oxygen permeabilities significantly less than 0.8 cm$^3$/m$^2$/d and water vapour permeabilities less than 0.3 g/m2/d.

The coated and metallized polyester films obtained from these formulations have then undergone an additional heat curing step (10 days at 60° C. in an oven).

The results are summarized in Table 3

TABLE 3

| | PO$_2$ (cm3/m2/d) | PH$_2$O (g/m2/d) | Dry metal adhesion (gF/38 mm) | Wet metal adhesion (gF/38 mm) |
|---|---|---|---|---|
| Latex 1 with Crosslinking agent X with PES→F12 | | | | |
| Latex 1 + Latex 2 with Crosslinking agent X with PES→F14 | | | | |
| Before Curing | | | | |
| F12 | 0.7 | 0.19 | >500 | 112 |
| F14 | 0.5 | 0.17 | >500 | 162 |
| After Curing | | | | |
| F12 | 0.65 | 0.18 | >500 | 350 |
| F14 | 0.46 | 0.22 | >500 | >500 |

Surprisingly, a net improvement in the wet metal adhesion is observed for the formulation composed of the two latexes in the presence of the crosslinking agent X at a concentration of 20% relative to the total dry weight of acrylic latex and containing PES (formulation F14). This improvement is also observed for formulation F12, but to a lesser degree. The combination of the latexes L1 & L2, i.e. acrylic and/or methacrylic polymers P1 & P2 according to the invention, combined with heat curing makes it possible to achieve the metal adhesion properties under wet conditions sought in the present invention.

The invention claimed is:

1. A composite film comprising a polymer support, at least one adhesive covering on at least one of the faces of the polymer support, and at least one cross-linked adhesion primer layer between the polymer support and the adhesive covering;
the composite film having barrier properties with respect to gases as well as for adhesion of the adhesive covering onto the polymer support,
wherein
the primer layer comprises at least one acrylic and/or methacrylic polymer P1, at least one acrylic and/or methacrylic polymer P2 different from P1, at least one crosslinking agent, and, optionally, at least one polyester that is soluble or dispersible in water;
P1 having a gel content TG1 greater than or equal to 70% dry weight with respect to the total dry weight of P1;
P2 having a gel content or equal to TG1 and less than or equal to 40% dry weight by weight with respect to the total dry weight of P2;
P1 having a surface-grafted free weak acid content greater than or equal to 0.8 microequivalent per gram of polymer and less than or equal to 2.0;
P2 having a surface-grafted free weak acid content greater than or equal to 0.8 microequivalent per gram of polymer and less than or equal to 2.0;
the mass concentration of P2 is less than or equal to 60% dry weight with respect to the total dry weight of P1 and P2.

2. The composite film according to claim 1, wherein P1 and P2 have the same qualitative and quantitative monomer composition.

3. The composite film according to claim 1, wherein it was cured for 1 to 50 days, at a temperature between 10 and 120° C. at ambient atmospheric pressure.

4. The composite film according to claim 1, wherein the dry mass ratio (weight/weight) of P1 or P2 relative to the crosslinking agent is between 95/5 and 50/50.

5. The composite film according to claim 1, wherein the crosslinking agent contains at least one resin.

6. The composite film according to claim 5, wherein the at least one resin is selected from the group consisting of resins derived from an amine based resin, a melamine aldehyde resin, and a benzoguanamine aldehyde resin.

7. The composite film according to claim 1, wherein it has one and/or the other of the following characteristics:
   i the polyester that is soluble or dispersible in water and is a carrier of sulphonyloxy groups and is selected from the group consisting of copolyesters derived from at least one aromatic dicarboxylic acid and from at least one aliphatic diol and containing a plurality of sulphonyloxy groups of formula (I):

in which n is equal to 1 or 2, M represents a hydrogen atom, an alkali or alkaline-earth metal, an ammonium cation or a quaternary ammonium cation;
   ii the polymer support is a polyester that is soluble or dispersible in water and has a polyester content between 2% and 30% by weight relative to the dry weight of acrylic and/or methacrylic polymer.

8. The composite film according to claim 1, wherein the average roughness Rz of the polymer support, on its face(s) carrying the adhesive covering, is less than or equal to 0.40 microns and wherein this face does not contain on average more than 20 peaks having a height equal to or greater than 1 micron and not more than 150 peaks having a height comprised between 0.4 and 1 microns, per square millimetre, when the thickness of the primer layer is less than 0.6 microns.

9. The composite film according to claim 8, wherein the face(s) of the polymer support covered with said at least one cross-linked adhesion primer layer does not contain on average more than 20 peaks having a height equal to or greater than 1 micron and not more than 100 peaks having a height comprised between 0.4 and 1 micron per square millimetre.

10. The composite film according to claim 1, wherein it has at least one of the following characteristics:
   the polymer support is a polyester support and is biaxially stretched;
   the polymer support is selected from polyterephtalates of alkylene diol or polynaphthalene-dicarboxylates of alkylene diol;
   the polymer support has a thickness less than or equal to 150 μm (micrometres);
   the polymer support is constituted by at least two layers having different surface properties;
   the polymer support is produced by a coextrusion of at least two layers of polyester each containing different filler contents and optionally different fillers;
   the polymer support partially comprises recycled polyester originating from the polymer support itself and/or from the polymer support coated with the cross-linked adhesion primer and/or from the polymer support coated with the aforementioned primer and covered with the adhesive covering.

11. The composite film according to claim 1, wherein the cross-linked adhesion primer layer(s) form an interface the thickness of which is less than or equal to 200 nm (nanometres).

12. The composite film according to claim 1, wherein it has at least one of the following characteristics:
the adhesive covering contains at least one metallic layer composed of at least one metal and/or at least one metal oxide and/or one silicon oxide;
the thickness of the adhesive covering is between 0.01 and 0.06 microns.

13. The composite film according to claim 1, wherein it has at least one of the following characteristics:
a permeability to oxygen, measured at 23° C. under 0% relative humidity, is less than or equal to 0.9 $cm^3/m^2/24$ h;
a permeability to water vapour, measured at 38° C. under 90% relative humidity, is less than or equal to 0.5 $g/m^2/24$ h;
an adhesion under wet conditions, measured in a test AT, is greater than or equal to 300 gf/38 mm.

14. A laminate comprising a first composite film according to claim 1 and optionally a second composite film each according to claim 1, wherein the first composite film is firmly fixed with at least one other film, selected from the group consisting of the optional second composite film, plastics, metals and metal oxides.

15. A method for the production, in-line or batch production of the composite film according to claim 1, comprising:
a—utilizing the polymer support;
b—optionally, carrying out a physical surface treatment of the polymer support;
c—coating at least one face of the polymer support with a coating composition making it possible to obtain at least one layer of the cross-linked adhesion primer;
d—cross-linking the coating in order to obtain the layer of cross-linked adhesion primer;
e—applying the adhesive covering on the layer of cross-linked adhesion primer;
f—subjecting the composite polymer support/primer/covering assembly to a heat curing for 1 to 50 days at a temperature comprised between 10 and 120° C. at ambient atmospheric pressure.

16. A coating composition, utilized in the method according to claim 15, wherein it comprises:
a mixture of at least two acrylic latexes L1, L2:
L1 comprising the at least one acrylic and/or methacrylic polymer P1;
L2 comprising the at least one acrylic and/or methacrylic polymer P2; and
at least one crosslinking agent.

17. The coating composition according to claim 16, wherein it has at least one of the following characteristics:
the latexes L1, L2 each have a dry extract of 10% to 30% by weight;
the primer comprises the at least one polyester that is soluble or dispersible in water, and a weight ratio of acrylic and/or methacrylic polymers to the at least one polyester, in aqueous solution, is from 99/1 to 50/50.

18. An article selected from the group consisting of food and non-food packaging, films or foils for support protection and films or foils for thermal insulation and protection against humidity in the building sector, wherein said article comprises at least one composite film according to claim 1.

* * * * *